United States Patent
Rice et al.

(10) Patent No.: US 10,125,622 B2
(45) Date of Patent: Nov. 13, 2018

(54) SPLAYED INLET GUIDE VANES

(71) Applicant: Rolls Royce North American Technologies Inc., Indianapolis, IN (US)

(72) Inventors: Edward C. Rice, Indianapolis, IN (US); Bradley S. Sumner, Carmel, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 539 days.

(21) Appl. No.: 14/837,190

(22) Filed: Aug. 27, 2015

(65) Prior Publication Data
US 2017/0058690 A1    Mar. 2, 2017

(51) Int. Cl.
F01D 9/04       (2006.01)
F04D 29/56    (2006.01)
F01D 17/16    (2006.01)
F02C 9/20       (2006.01)

(52) U.S. Cl.
CPC ........... F01D 9/041 (2013.01); F01D 17/162 (2013.01); F02C 9/20 (2013.01); F04D 29/563 (2013.01); F05D 2240/12 (2013.01); F05D 2260/53 (2013.01); F05D 2260/56 (2013.01); Y02T 50/673 (2013.01)

(58) Field of Classification Search
CPC .......... F01D 9/031; F01D 17/162; F02C 9/20; F05D 2240/12; F05D 2260/53; F05D 2260/56; Y02T 50/673; F04D 29/563
See application file for complete search history.

(56) References Cited

U.S. PATENT DOCUMENTS

| | | | |
|---|---|---|---|
| 3,442,493 A | 5/1969 | Smith, Jr. | |
| 3,739,580 A | 6/1973 | Bland et al. | |
| 3,771,559 A * | 11/1973 | Alley | F16K 1/165 |
| | | | 137/601.06 |
| 3,861,822 A | 1/1975 | Wanger | |
| 3,946,554 A | 3/1976 | Neumann | |
| 4,000,868 A | 1/1977 | Gregor | |
| 4,089,493 A | 5/1978 | Paulson | |
| 4,235,397 A | 11/1980 | Compton | |
| 4,254,619 A | 3/1981 | Giffin, III et al. | |
| 4,705,452 A | 11/1987 | Karadimas | |
| 4,791,783 A | 12/1988 | Neitzel | |
| 5,180,119 A | 1/1993 | Picard | |

(Continued)

FOREIGN PATENT DOCUMENTS

GB    813343 A  *  5/1959  ........... F01D 17/162

*Primary Examiner* — Woody Lee, Jr.
*Assistant Examiner* — Jesse Prager
(74) *Attorney, Agent, or Firm* — Duane Morris LLP

(57) ABSTRACT

A system for directing the flow of a fluid and controlling the rate of flow of the fluid. The system comprises a channel for directing the flow of the fluid; at least a pair of articulating vanes positioned within the channel for controlling the flow rate of the fluid within the channel; and a linkage between the vanes coupling the articulation of each of the vanes to the other of the vanes, wherein each vane imparts a force on the linkage when the relative angle of attack is greater than zero, wherein the force imparted on the linkage by one of the vanes is at least partially cancelled by the force imparted on the linkage by the other of the vanes during the articulation of the vanes.

19 Claims, 14 Drawing Sheets

(56) References Cited

U.S. PATENT DOCUMENTS

| | | |
|---|---|---|
| 5,314,301 A | 5/1994 | Knight |
| 5,464,175 A | 11/1995 | Short |
| 5,472,314 A | 12/1995 | Delonge et al. |
| 5,518,363 A | 5/1996 | Theis |
| 5,520,511 A | 5/1996 | Loudet et al. |
| 5,855,340 A | 1/1999 | Bacon |
| 5,911,679 A | 6/1999 | Farrell et al. |
| 5,947,412 A | 9/1999 | Berman |
| 6,379,110 B1 | 4/2002 | McCormick et al. |
| 6,439,838 B1 * | 8/2002 | Crall .................. F01D 5/26 415/119 |
| 6,845,606 B2 | 1/2005 | Franchet et al. |
| 7,033,132 B2 | 4/2006 | Gharib |
| 7,059,129 B2 | 6/2006 | Zollinger et al. |
| 7,114,911 B2 | 10/2006 | Martin et al. |
| 7,134,631 B2 | 11/2006 | Loth |
| 7,140,188 B2 | 11/2006 | Hosokawa et al. |
| 7,444,802 B2 | 11/2008 | Parry |
| 7,464,533 B2 | 12/2008 | Wollenweber |
| 7,491,030 B1 | 2/2009 | Pinera et al. |
| 7,549,839 B2 | 6/2009 | Carroll et al. |
| 7,631,483 B2 | 12/2009 | Mani et al. |
| 7,665,689 B2 | 2/2010 | McComb |
| 7,669,404 B2 | 3/2010 | Samimy et al. |
| 7,828,516 B2 | 11/2010 | Hartmann et al. |
| 7,837,436 B2 | 11/2010 | Corsmeier et al. |
| 7,877,980 B2 | 2/2011 | Johnson |
| 7,887,287 B2 | 2/2011 | Yanagi et al. |
| 8,011,882 B2 | 9/2011 | McMillan |
| 8,152,095 B2 | 4/2012 | Cazals et al. |
| 8,161,728 B2 | 4/2012 | Kupratis |
| 8,336,289 B2 | 12/2012 | Roberge |
| 8,393,857 B2 | 3/2013 | Copeland et al. |
| 8,468,795 B2 | 6/2013 | Suciu et al. |
| 8,529,188 B2 | 9/2013 | Winter |
| 8,578,700 B2 | 11/2013 | Khakhar |
| 8,657,561 B2 | 2/2014 | Buffone et al. |
| 8,770,921 B2 | 7/2014 | Huber et al. |
| 8,813,907 B2 | 8/2014 | Tanaka et al. |
| 8,862,362 B2 | 10/2014 | Teicholz et al. |
| 8,915,703 B2 | 12/2014 | Mohammed |
| 9,003,768 B2 | 4/2015 | Suciu et al. |
| 9,016,041 B2 | 4/2015 | Baughman et al. |
| 9,017,038 B2 | 4/2015 | Pelley et al. |
| 2008/0131268 A1 | 6/2008 | Guemmer |
| 2010/0166543 A1 | 7/2010 | Carroll |
| 2011/0146289 A1 | 6/2011 | Baughman |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0176913 A1 * | 7/2011 | Wassynger ............ F01D 17/162 415/159 |
| 2011/0252808 A1 | 10/2011 | McKenney et al. |
| 2012/0308364 A1 * | 12/2012 | Hofmann ............. F01D 17/162 415/148 |
| 2013/0323013 A1 | 12/2013 | Mercier et al. |
| 2014/0090388 A1 | 4/2014 | Hasel |
| 2014/0260180 A1 | 9/2014 | Kupratis et al. |
| 2014/0345253 A1 | 11/2014 | Dawson et al. |
| 2015/0102156 A1 | 4/2015 | Devenyi |
| 2015/0121838 A1 | 5/2015 | Suciu et al. |
| 2015/0361819 A1 * | 12/2015 | Epstein .................. F01D 9/041 415/1 |
| 2015/0369135 A1 * | 12/2015 | Laster .................... F23R 3/14 60/39.23 |
| 2016/0053692 A1 * | 2/2016 | Izquierdo ............. F01D 17/162 415/1 |
| 2016/0069204 A1 * | 3/2016 | Izquierdo ............. F01D 17/162 415/1 |

\* cited by examiner

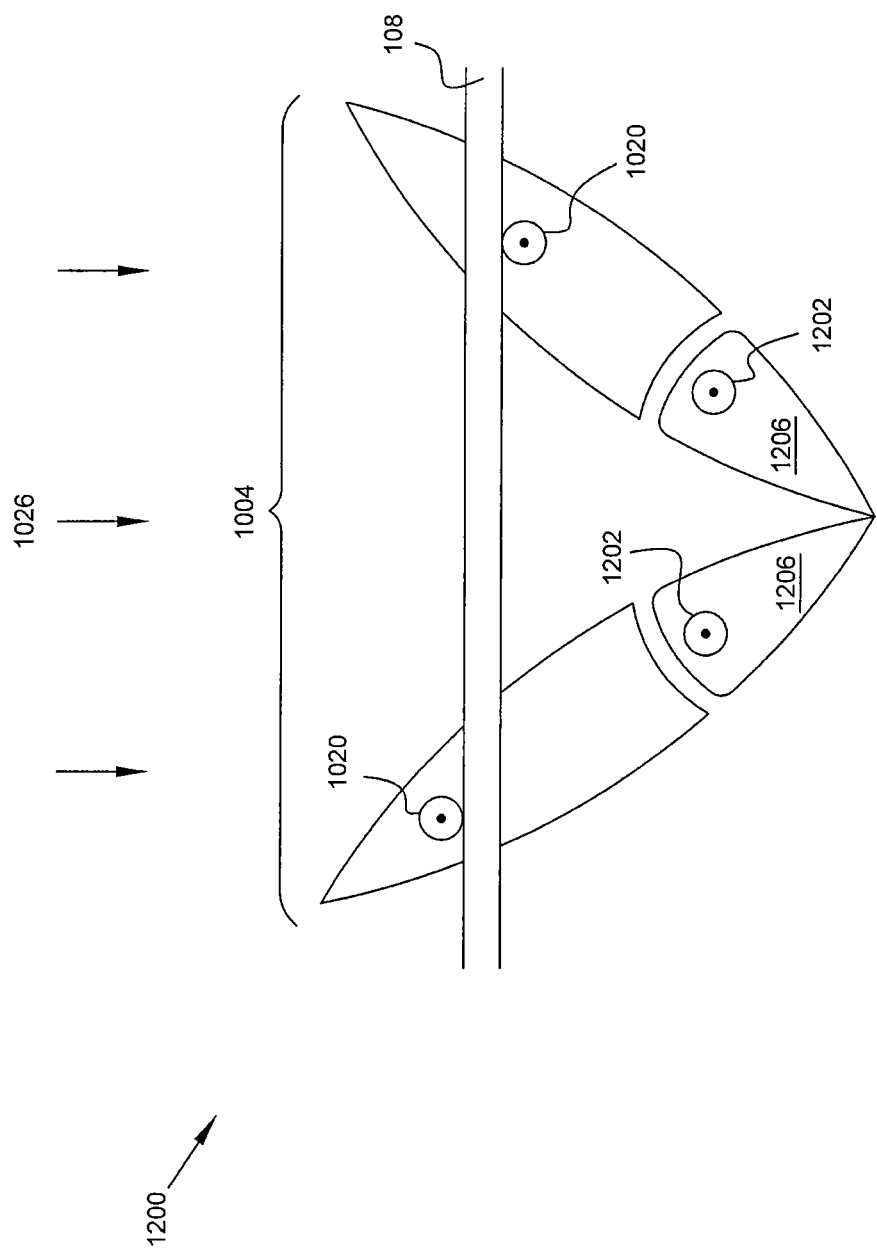

SPLAYED INLET GUIDE VANES

RELATED APPLICATIONS

This application is related to concurrently filed and co-pending applications U.S. patent application Ser. No. 14/837,302 entitled "Morphing Vane"; U.S. patent application Ser. No. 14/837,557 entitled "Propulsive Force Vectoring"; U.S. patent application Ser. No. 14/837,942 entitled "A System and Method for a Fluidic Barrier on the Low Pressure Side of a Fan Blade"; U.S. patent application Ser. No. 14/837,079 entitled "Integrated Aircraft Propulsion System"; U.S. patent application Ser. No. 14/837,987 entitled "A System and Method for a Fluidic Barrier from the Upstream Splitter"; U.S. patent application Ser. No. 14/837,031 entitled "Gas Turbine Engine Having Radially-Split Inlet Guide Vanes"; U.S. patent application Ser. No. 14/838,027 entitled "A System and Method for Creating a Fluidic Barrier with Vortices from the Upstream Splitter"; U.S. patent application Ser. No. 14/838,067 entitled "A System and Method for Creating a Fluidic Barrier from the Leading Edge of a Fan Blade." The entirety of these applications are incorporated herein by reference.

FIELD OF THE DISCLOSURE

The present disclosure generally relates to systems used to control fluid flow rate. More specifically, the present disclosure is directed to systems which use articulating vanes to control fluid flow rate.

BACKGROUND

Many fluid systems use articulating vanes to control the direction and flow rate of the fluid within the system. Gas turbine engines are one example of such a fluid system. The typical gas turbine engine controls the flow rate of the air moving through engine with an array of vanes located in the inlet or outlet of the engine, or in a duct within the engine. As the vanes are articulated, the vanes are subjected to fluid impingent on the surface of the vane which imparts an aerodynamic force on the vane. Traditional vanes are designed to articulate about an axis intersecting the vane in a location such that the aerodynamic forces acting on each side of the axis is balanced in order to minimize the net aerodynamic moment on the vane, thereby "self-balancing" the vane. However, the complexity of fluid flow over a range of angles of attack frustrates the design of these self-balanced vanes. A given vane may be incapable of self-balancing over a range of angles of attack since the aerodynamic forces on the leading and trailing surface areas of the vane may vary differently from one another.

Additionally, the array of vanes within a typical gas turbine engine also articulate uniformly in a single direction. Since each vane will not be self-balanced over a range of angles of attack, the moments exerted on the array of vanes will lead to an accumulation of resisting forces on the vane actuator. Typical vane actuation systems and actuators are sized based on these accumulating forces. In turn, the size and weight of the envelope surrounding the engine duct is affected by the size of the actuator.

The present application discloses one or more of the features recited in the appended claims and/or the following features which, alone or in any combination, may comprise patentable subject matter.

The present disclosure is directed to a system which addresses the deficiencies of accumulating loads caused by the shortcomings of self-balanced vanes.

According to an aspect of the present disclosure, a system is provided for directing the flow of a fluid and controlling the rate of flow of the fluid. The system comprises a channel for directing the flow of the fluid; at least a pair of articulating vanes positioned within the channel for controlling the flow rate of the fluid within the channel, each of the vanes comprising a pair of lateral major surfaces forming a leading edge and a trailing edge of the vane, and an axis of articulation intersecting the vane at a point spaced from the aerodynamic center of the vane; and a linkage between the vanes coupling the articulation of each of the vanes to the other of the vanes, wherein each vane imparts a force on the linkage when the relative angle of attack is greater than zero, wherein the force imparted on the linkage by one of the vanes is at least partially cancelled by the force imparted on the linkage by the other of the vanes during the articulation of the vanes.

According to another aspect of the present disclosure, a system is provided for directing the flow of a fluid in a turbofan jet engine and controlling the rate of flow of the fluid. The system comprises a duct for directing the flow of the fluid along a centerline axis of the engine; an array of articulating vanes positioned circumferentially around the centerline axis within the duct for directing and controlling the flow of the fluid within the duct, each of the vanes comprising a pair of lateral major surfaces forming a leading edge and trailing edge of the vane, a stem protruding through the duct, and an axis of articulation intersecting the vane at a point spaced from the aerodynamic center of the vane; and a circumferential actuation ring positioned outside the duct, the actuation ring being operably coupled to the stern of each of the vanes to couple the articulation of each vane about its axis of articulation, wherein each vane imparts a force on the actuation ring when the relative angle of attack is greater than zero, wherein the force imparted on the actuation ring by one of the vanes is at least partially cancelled by the force imparted on the actuation ring by at least one other of the vanes during articulation of the vanes.

BRIEF DESCRIPTION OF THE DRAWINGS

The following will be apparent from elements of the figures, which are provided for illustrative purposes and are not necessarily to scale.

FIG. 14 is a further overhead view of the inlet guide vane of FIG. 12 in accordance with some embodiments of the present disclosure While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

Figure 1:
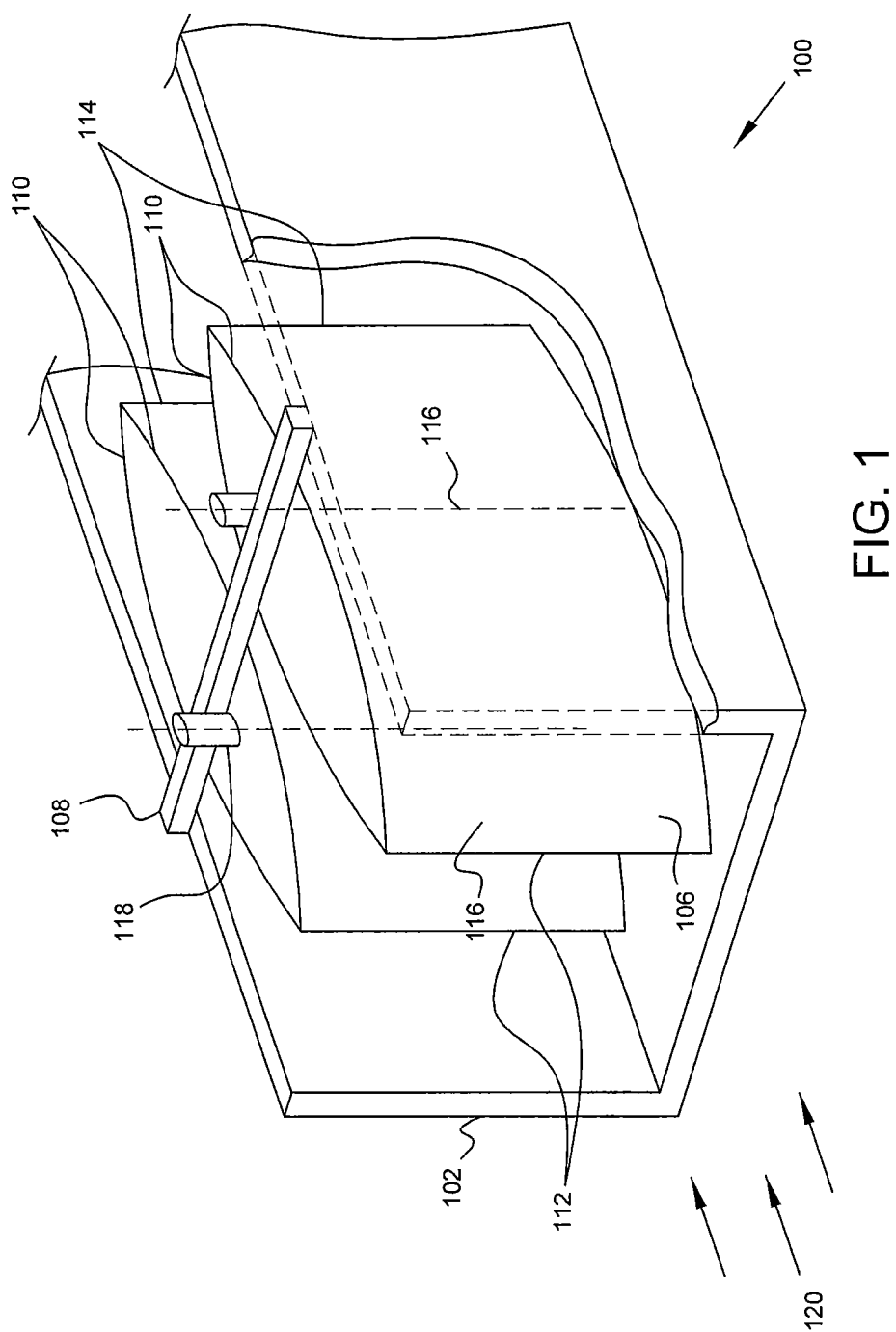
FIG. 1 is a cutaway perspective view of a fluid flow control system in accordance with some embodiments of the present disclosure.

For the purposes of promoting an understanding of the principles of the disclosure, reference will now be made to a number of illustrative embodiments illustrated in the drawings and specific language will be used to describe the same.

This disclosure presents numerous embodiments to overcome the aforementioned deficiencies of self-balanced vanes used in fluid system. More specifically, this disclosure is directed to the inter-balancing of forces and moments on vanes.

An illustrative system 100 for directing and controlling the flow of a fluid is shown in FIG. 1. The system includes a channel 102 for directing the fluid flow within the system, at least a pair of vanes, including a first vane 104 and a second vane 106, for controlling the fluid flow rate within the system and a linkage 108 which couples the articulation of the first and second vanes 104, 106. The arrows 120 represent the direction of the fluid flow. The linkage 108 is shown as an elongated member positioned transverse to the direction of flow 120. In some embodiments, the linkage 108 may be positioned in other orientations.

The channel 102 as shown in FIG. 1 is an open channel comprising a horizontal surface with two parallel, vertical surfaces extending therefrom. This channel is open because it does not have a second horizontal surface which is displaced from the first horizontal surface and connects the two vertical surfaces. The channel 102 is not limited to the open, rectangular channel shown in FIG. 1. In some embodiments the channel 102 may be closed. In some embodiments the channel 102 may be cylindrical or have some other cross-sectional shape. A person of ordinary skill in the art will recognize that particular design of the channel 102 will depend on the working fluid and application for which the channel 102 is used.

The first and second vanes 104, 106 are positioned within the channel 102 to control the fluid flow rate within the channel 102. In some embodiments the first and second vanes 104, 106 also direct the fluid flow within the channel 102. Each vane 104, 106 includes a pair of lateral major surfaces 110 which form a leading edge 112 and a trailing edge 114. The vanes 104, 106 articulate about an axis of articulation 116. The vanes 104, 106 may have a stem 118 with an center coincident with the axis of articulation 116.

As shown in FIG. 1, the vanes 104, 106 may be positioned within the channel 102 such that the lateral major surfaces 110 and the axes of articulation 116 are oriented vertically. In other embodiments these components may be oriented horizontally or in some other orientation. One of skill in the art will recognize that the shape of the lateral major surfaces 110 may not be uniform around the chord of vanes 104, 106, but rather may take on a complex surface profile to enhance efficiency of the system. The efficiency may result from reducing the fluid friction within the system or by controlling the angle at which the fluid leaves the vanes 104, 106. This may be particularly important for systems in which a fan, compressor, pump, or other component is located downstream of the vanes 104, 106. The complex surface profiles of the lateral major surfaces 110 may also affect the particular shape and orientation of the leading and trailing edges 112, 114 which may or may not be vertically oriented as shown in FIG. 1.

Figure 2:
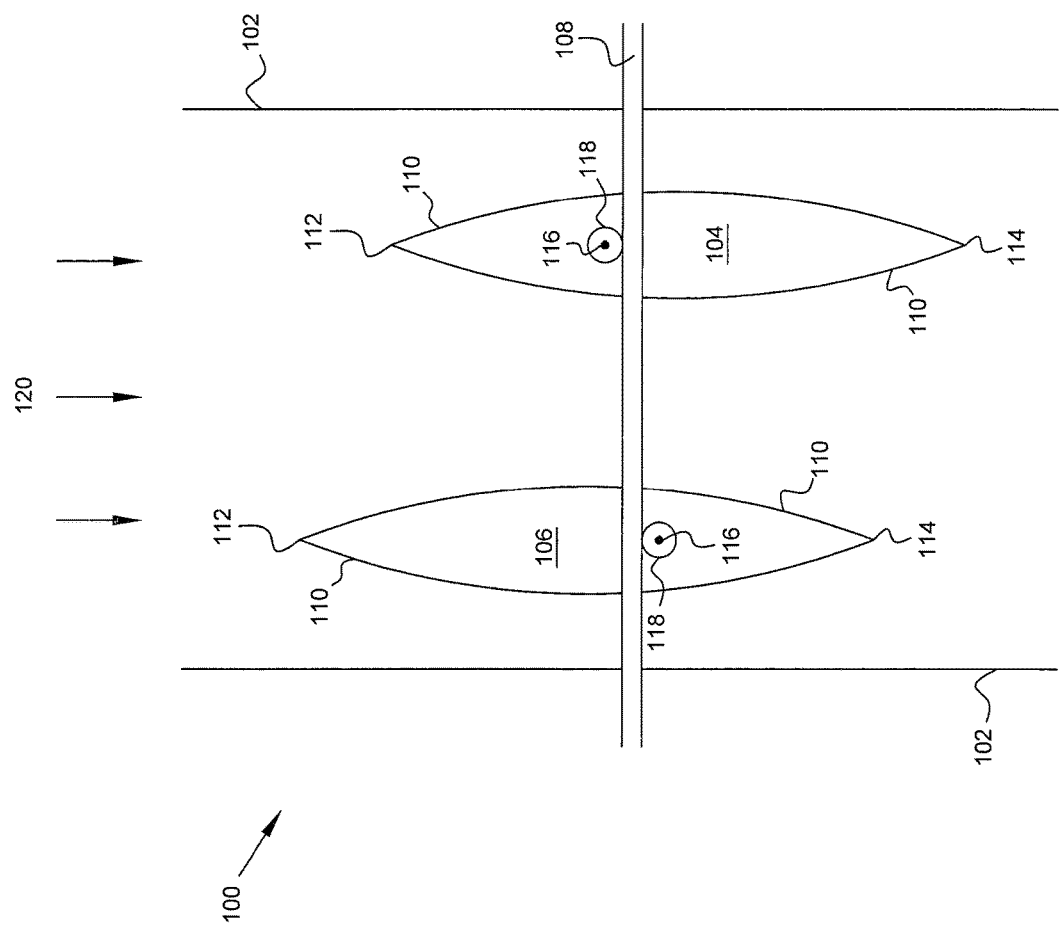
FIG. 2 is an overhead view of the system of FIG. 1 in accordance with some embodiments of the present disclosure.

In some embodiments, the axis of articulation 116 may intersect a vane at a point spaced from the aerodynamic center of the vane. This feature is further illustrated in FIG. 2 which provides an overhead view of the system in FIG. 1. FIG. 2 shows that the axis of articulation 116 for the first vane 104 is located between the aerodynamic center (not shown) and leading edge 112 of vane 104. The axis of articulation 116 of the second vane 106 is located between the aerodynamic center (not shown) and the trailing edge 114 of vane 106. An axis of articulation can be vertically oriented as is shown in FIG. 1, or it can be oriented in some other direction.

During articulation, the relative angle of attack of the vanes 104, 106 will change, thereby subjecting vanes 104, 106 to the flow and pressure forces from the system fluid. These forces will act on the lateral major surfaces 110 of vanes 104, 106. The net force from the fluid forces produces a moment on each vane 104, 106. In turn, this moment will create a force on the linkage 108 to which each vane 104 and 106 is operably coupled.

Figure 3:
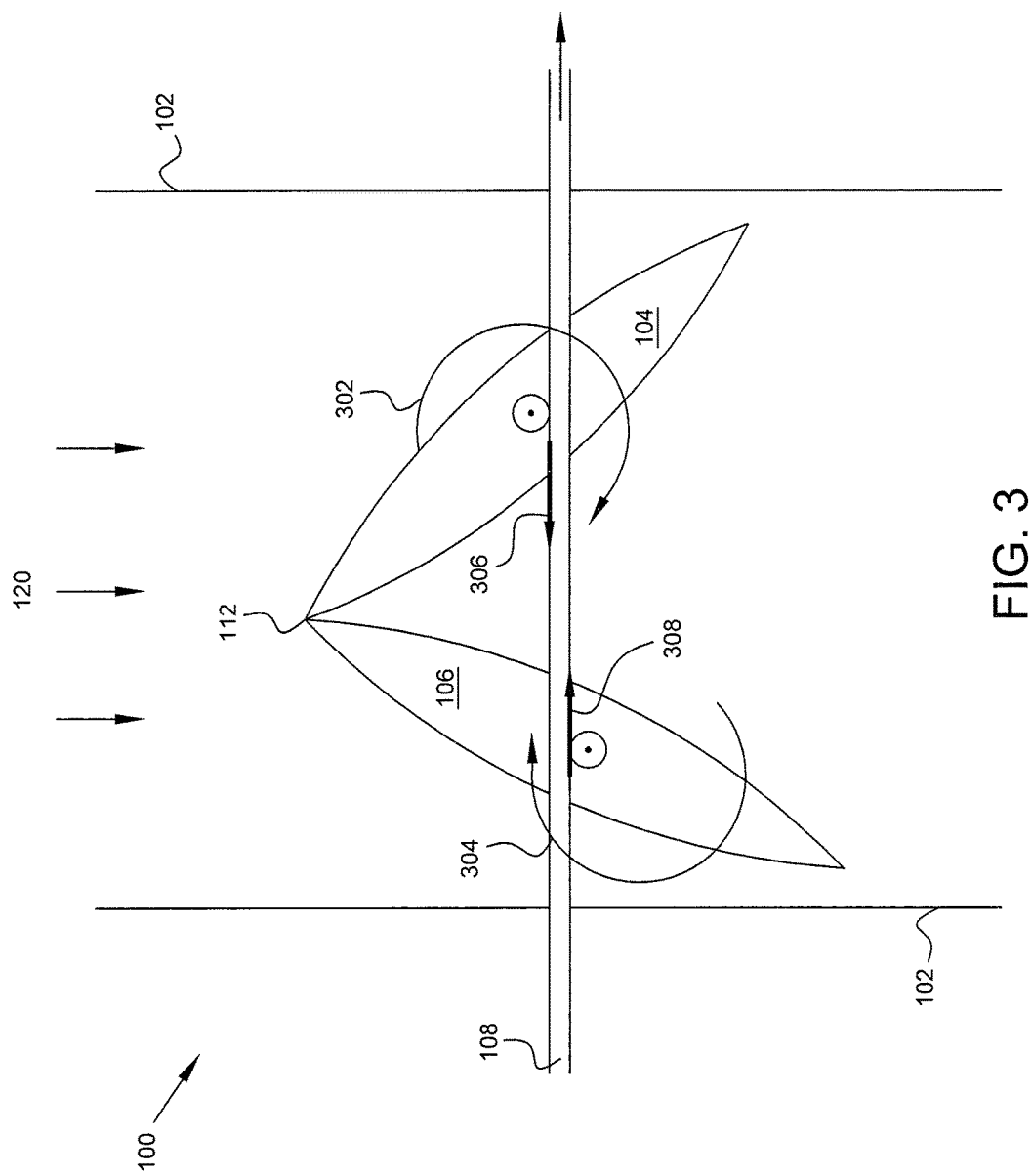
FIG. 3 is a further overhead view of the system of FIG. 1 in accordance with some embodiments of the present disclosure.

FIG. 3 is an overhead view of the system in FIG. 1 showing the articulation of the first and second vanes 104, 106. The second vane 106 articulates clockwise about its axes of articulation 116 while the first vane 104 articulates counterclockwise. Vanes 104 and 106 articulate in different directions because the first vane 104 engages the linkage 108 on the leading edge of the linkage 108 whereas the second vane 106 engages a trailing edge of the linkage 108 which couples the articulation of the vanes 104, 106. Since the linkage 108 couples the articulation of the vanes 104, 106, the linkage 108 will move to the right during the above articulation of the vanes 104, 106. Articulation of the vanes 104, 106 can proceed from their initial starting position, as seen in FIG. 2, until the vanes 104, and 106 make contact with one another as shown in FIG. 3. While the embodiment shown in FIG. 3 shows the leading edges 112 of vanes 104, 106 in contact within one another, it should be understood that the vanes can be designed such that the leading edge 112 of one of the vanes 104, 106 may contact the other vane on a lateral major surface 110. In some embodiments, the lateral major surfaces 110 of vanes 104, 106 will make contact at the final articulation position.

As the vanes 104, 106 articulate they are subjected to the fluid forces described above. These forces will create a first moment 302 about the first vane 104 and a second moment 304 about the second vane 106, which will be transferred through the operable coupling to the linkage 108 as forces 306 and 308. These forces act upon the linkage 108 in opposite directions, thereby at least partially cancelling one of these forces 306 or 308 with the other force. By balancing the profile of lateral major surfaces 110, the location of the vanes 104, 106 within the channel, and the location of the axis of articulation 116 for each vane 104 and 106 the forces 306 and 308 may substantially cancel each other for a given flow condition within the channel 102.

Figure 4:
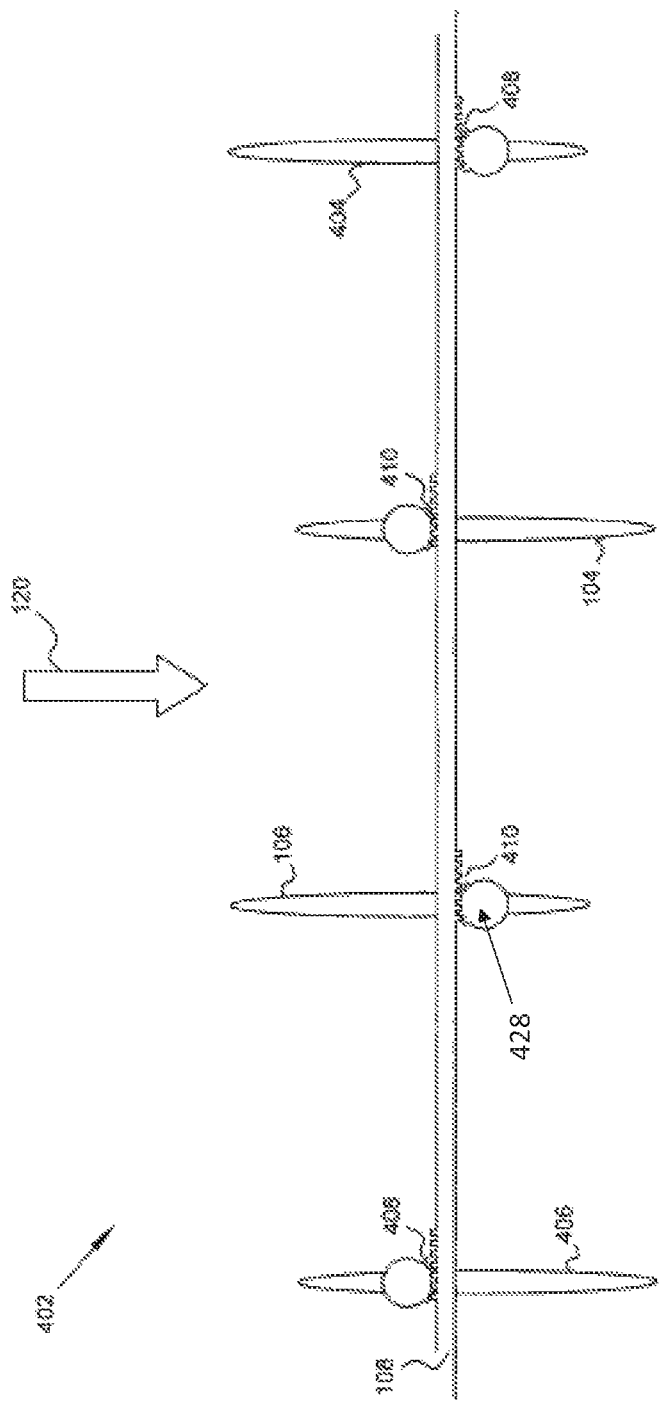
FIG. 4 is an overhead view of a fluid flow control system in accordance with some embodiments of the present disclosure.

While the embodiment of FIGS. 1-3 disclosed a system comprising vanes 104, 106, it should be understood that the disclosure is not constrained to a pair of vanes, but may comprise any array of greater than one vane. FIG. 4 shows an embodiment of an array 402 of vanes. This embodiment may be considered an expansion of the embodiment in FIGS. 1-3, wherein the array is comprised of center vanes 104 and 106 in addition to a third vane 404 and fourth vane 406. In some embodiments, the third vane 404 is designed and proportioned to be identical the second vane 106. The fourth vane 406 may be designed and proportioned to be identical to the first vane 104. Each vane of the array 108 is coupled to the articulation of the other vanes in the array by linkage 108.

In some embodiments, the vanes may further comprise a stem upon which a set of gears 408 is disposed. The linkage 108 may further comprises a rack with a plurality of gear teeth 410. In this embodiment, the gear teeth 410 operably engage the gear set 408, thereby operably coupling the linkage 108 to each vane. This operable coupling also couples the articulation of each vane 104, 106, 404, and 406. In some embodiments, lever arms may operably couple the linkage 108 and the stems 118. In some embodiments, the linkage 108 may be operably coupled to the stems 118 via a system 428 of cams and restoring springs. These springs act to return the vanes to their original position.

In some embodiments, the stem 118 of various vanes may have different radii from one another. Vanes with larger radius stems 118 will rotate more slowly than those vanes with a stern of a smaller radius. In some embodiments, the stem 118 is comprised of an eccentric or continuously changing radius. This allows the vanes to be rotated and different and changing rates.

Figure 5:
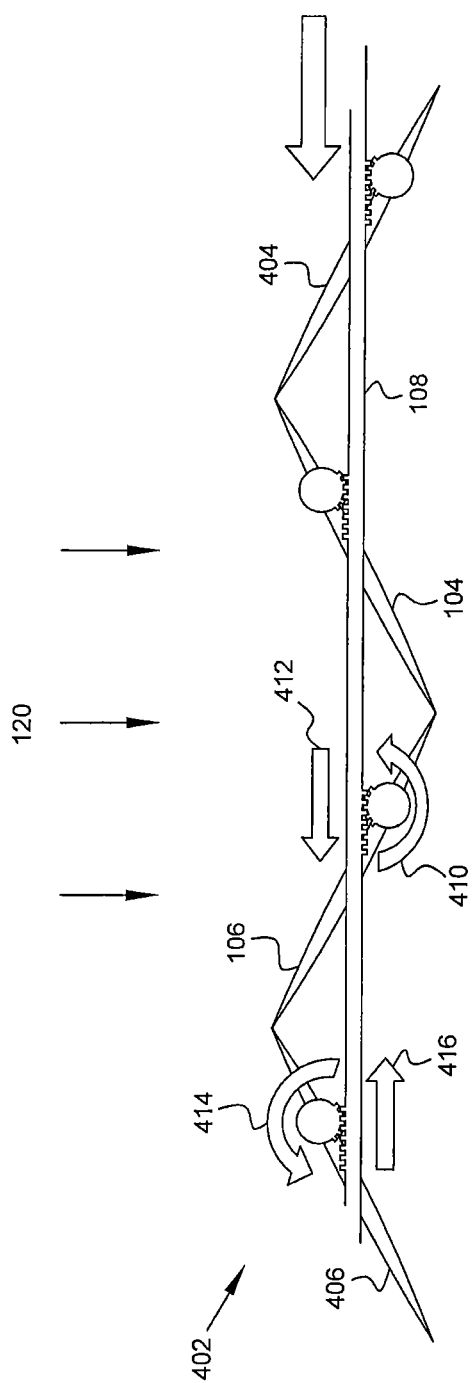
FIG. 5 is a further overhead view of the system of FIG. 4 in accordance with some embodiments of the present disclosure.

As shown in FIG. 5, when any vane 104, 106, 404, 406 is articulated, this articulation is coupled to the articulation of the other of these vanes through the linkage 108. If vane 106 is articulated in the counterclockwise direction, this articulation is coupled to the counterclockwise articulation of vane 404, the clockwise articulation of vanes 104 and 106 and the movement of the linkage 108 to the left. As described above, fluid flow and pressure forces will act on the lateral major surfaces of each of the vanes, producing a net force and moment which is transferred to the linkage 108. Moment 410 will act on vane 106 to produce force 412 on the linkage 108. Moment 414 will act on vane 406 to produce force 416 on linkage 408. In the embodiment in which vane 406 is identical to vane 104 and the vane 404 is identical to vane 106, vanes 104 and 404 will be subjected to the same magnitude of moments and produce the same force on linkage 108 as is produced from vanes 406 and 106, respectively. The total net forces on linkage 108 will at least partially cancel, and may substantially cancel depending on the design parameters of the system.

Figure 6:
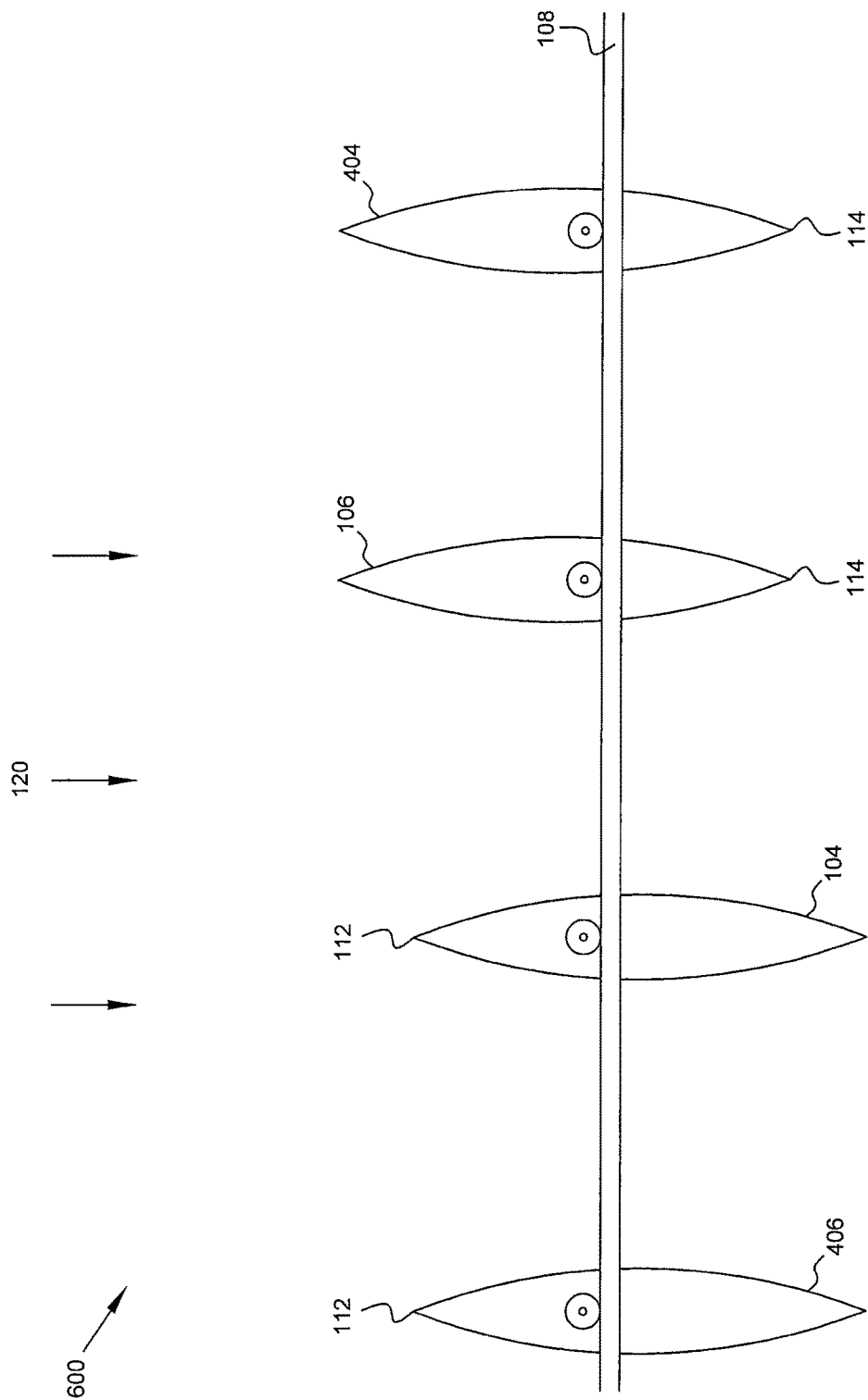
FIG. 6 is an overhead view of a fluid flow control system in accordance with some embodiments of the present disclosure.
Figure 7:
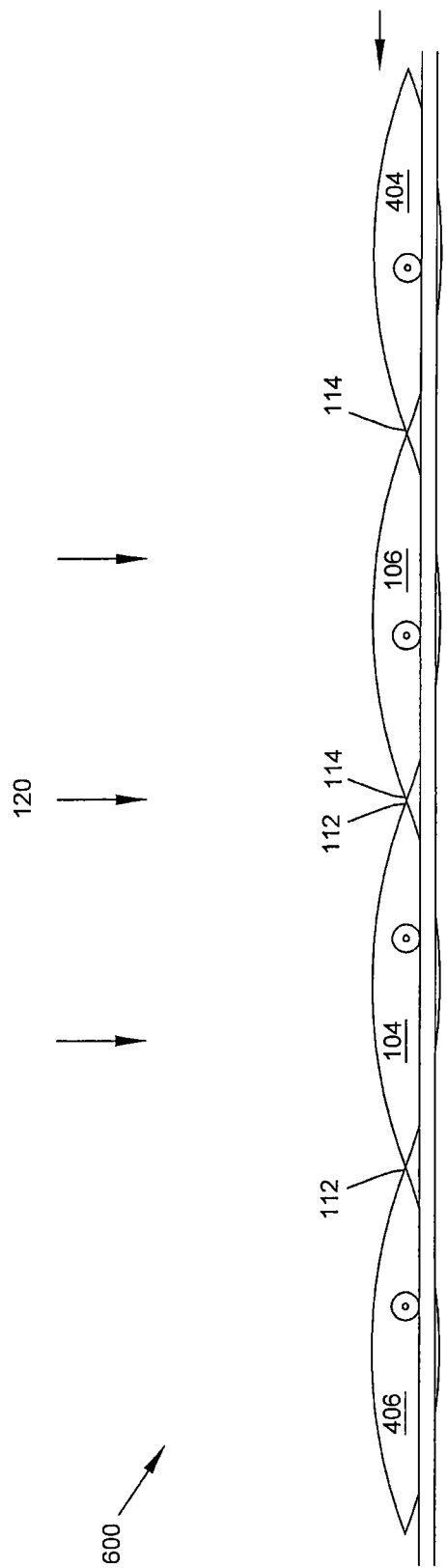
FIG. 7 is a further overhead view of the system of FIG. 6 in accordance with some embodiments of the present disclosure.

FIG. 6 shows an fluid flow control system in accordance with some embodiments of the present disclosure. While the array of vanes 600 may be composed of the same vanes as those in FIG. 5, the axis of articulation 116 for each vane is operably coupled to the leading edge of the linkage 108 and the vanes 104 and 106 have swapped positions. The forces generated on the linkage 108 during the articulation of the vanes still partially or substantially cancel, but in this embodiment, the pair of vanes which produce forces which cancel one another are no longer adjacent to one another. Additionally, some embodiments may varying the lateral spacing between the axes of articulation 116, as is shown in FIG. 6. Here, the lateral spacing between axes of articulation of vanes 104 and 106 is less than that between the other pairs of adjacent vanes: 406 and 104, and 406 and 404. FIG. 7 shows the clockwise articulation of all vanes of FIG. 6 until the leading or trailing edge 112, 114 of each vane engages a leading or trailing edge of at least one adjacent vane.

In some embodiments, the lateral spacing between the axes of articulation 116 of one pair of vanes which are adjacent to one another is not equal to the lateral spacing between the axes of articulation of at least one other pair of adjacent vanes. The vanes may be designed in such a way that the forces from two or more vanes cancel the force from a single other vane. For instance, the surface area of a vane forward of the axis of articulation may be twice as large as the surface area aft of the axis of articulation of two other vanes. During articulation, the force generated on this first vane may be twice that of each of the individual two other vanes, such that the two other vanes, together, cancel the force on the first vane. Since the areas of the two other vanes is smaller than the first, the distance between the axes of articulation for the other two will be less than that between the first vane and either of the second two vanes. This spacing also allows the vanes to operably engage one another to close the channel.

Figure 8:
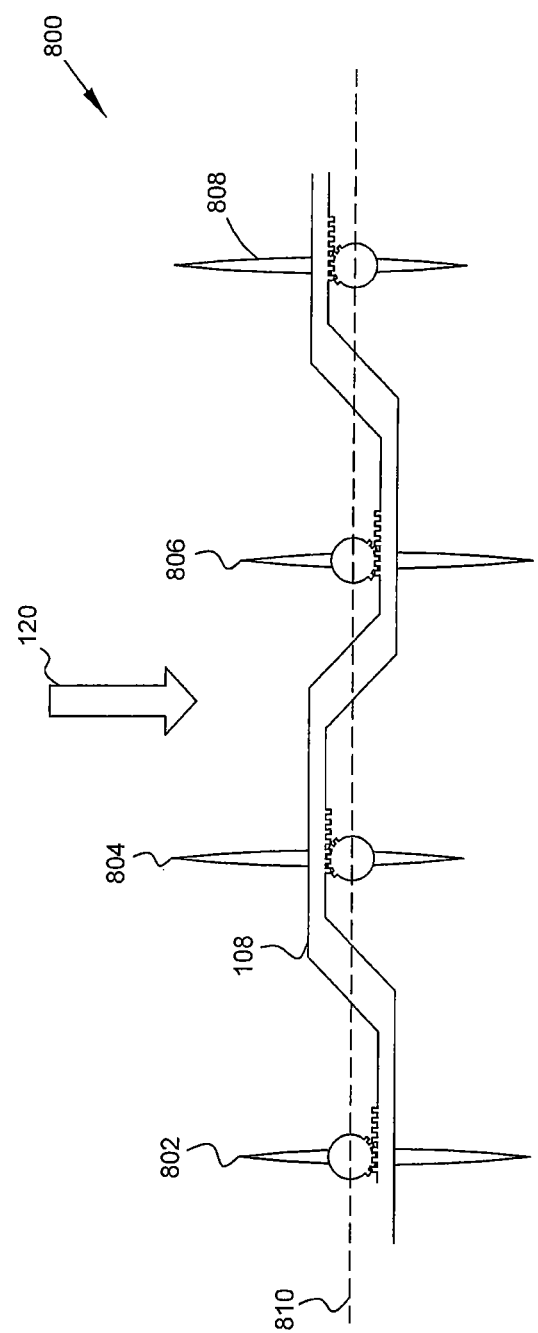
FIG. 8 is an overhead view of a fluid flow control system in accordance with some embodiments of the present disclosure.
Figure 9:
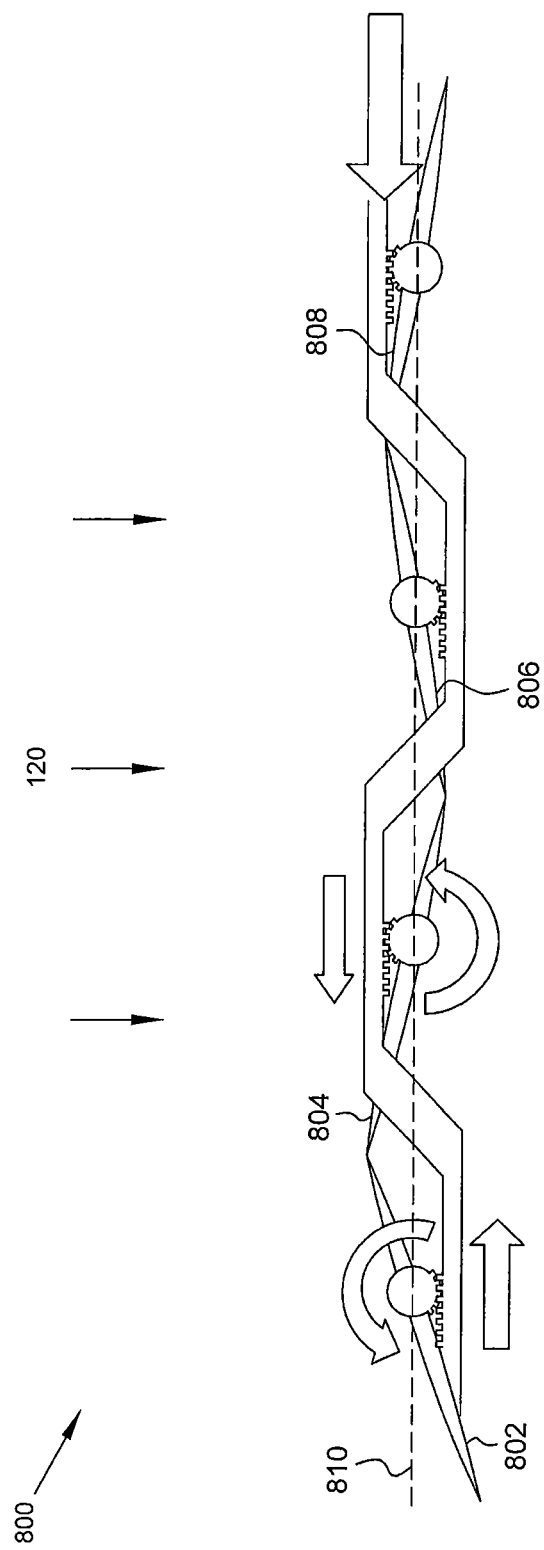
FIG. 9 is a further overhead view of the system of FIG. 8 in accordance with some embodiments of the present disclosure.

FIG. 8 shows an embodiment of an array of vanes 800 in accordance with some embodiments. In this embodiment, the axes of articulation 116 of the vanes 802-808 are laterally aligned as indicated by line 810. Vanes 802 and 806 are operably coupled to the leading edge of the linkage 108 and vanes 804 and 808 are operably coupled to the trailing edge of linkage 108. This staggering of vanes 802-808 on the leading and trailing edges while maintaining the lateral alignment of each axis of articulation 116 is achieved by using a linkage 108 being composed of a series of offset portions. In some embodiments, the linkage 108 may comprise two separate portions wherein one is located forward to the other. Whether the axes of articulation are staggered in the direction of the fluid flow 120 or the linkage 108 is offset can be determined by the particular space constraints of a given application. FIG. 9 illustrates the articulation of the vanes 802-808 until each vane engages at least one other adjacent vane. In this embodiment, a leading edge of a vane operably engages the leading edge of an adjacent vane. Likewise, a trailing edge of one vane engages the trailing edge of an adjacent vane. The forces exerted on linkage 108 at least partially cancel as disclosed above.

In some embodiments, the linkage 108 may comprise a plurality of linkages. The system may be designed such that one linkage moves in one direction, while the another linkage moves in a different direction. Linkages may also be designed to operate vanes in only a portion of the channel.

In some embodiments, the system may further comprise an actuator member. The actuator member may be an electric, pneumatic, hydraulic or other motor. The actuator member may move the linkage 108 in a manner such that the linkage 108 articulates the vanes of the system. The articulation of each vane beyond a relative angle of attack of zero will subject the vane to the flow and pressure forces of the system fluid. This will exert a moment on each vane which in turn exerts a force on the linkage 108. The forces will partially or substantially cancel, thereby reducing the resisting force which the actuator member must overcome to move the linkage 108. This is allow for the use of smaller or less powerful actuators to throttle or even stop of the flow of fluid in a channel. Whether the vanes engage a common trailing or leading edge of the linkage 108, or some vanes engage a leading edge, and others the trailing edge of the linkage 108 may determine if the articulation direction of each vane is the same, or if the direction differs for some. In some embodiment, the use of an idler gear or other mechanism may be used to affect articulation in a different direction than if the vane were directly coupled to the linkage 108. Regardless, the embodiments of the disclosure allow for the actuator member to affect articulation of the vanes, through the linkage 108, in the same direction, or in more than a single, uniform direction.

In some embodiments, the rate of articulation of a vane can be varied by using stems of different sizes or lever arms of differing lengths.

Figure 10:
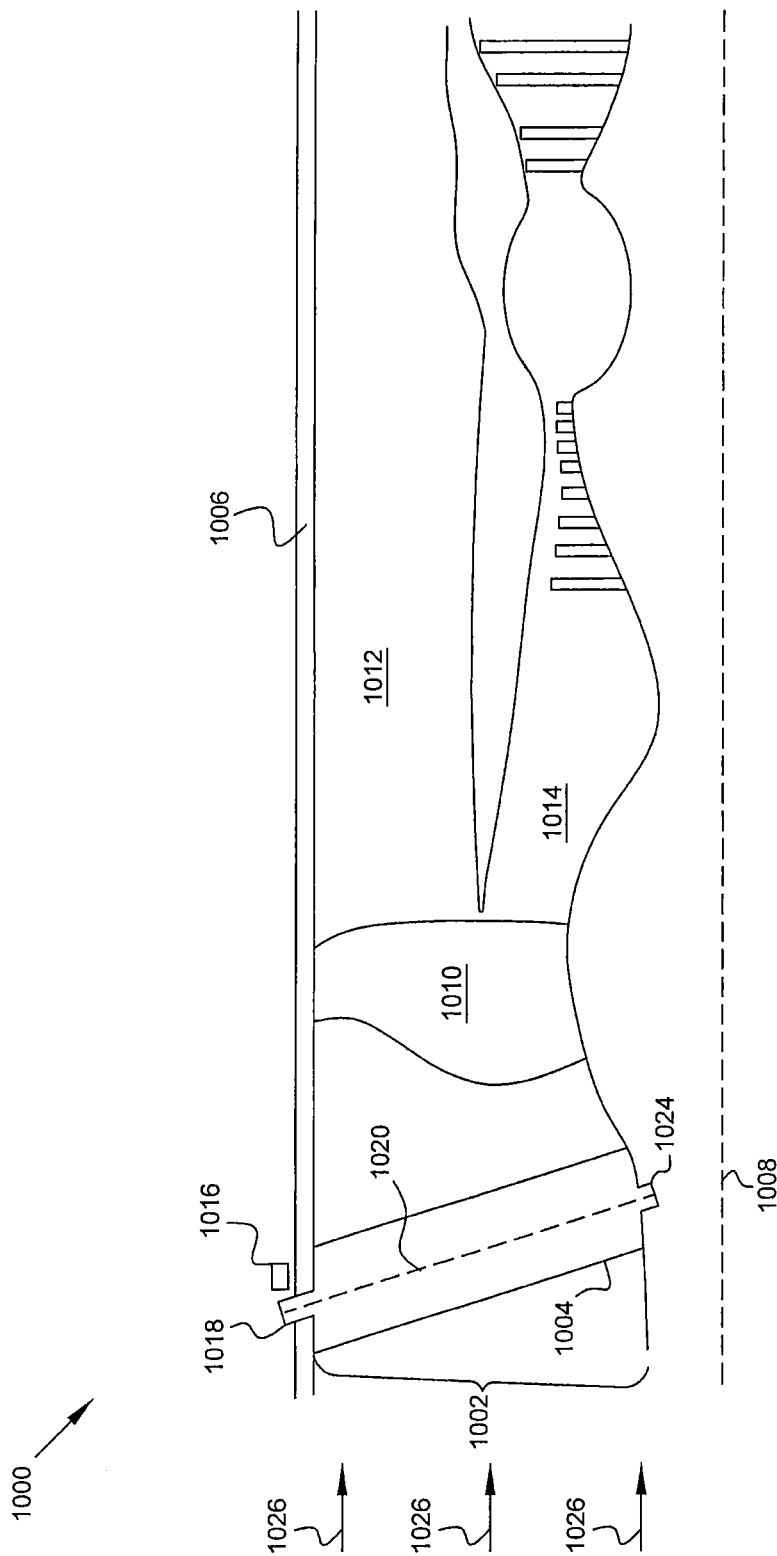
FIG. 10 is a axial cross-section view of a gas turbine engine in accordance with some embodiments of the present disclosure.

In some embodiments, the channel 102 of FIGS. 1-3 may be a duct 1002 of a gas turbine engine 1000 as shown in FIG. 10. The engine 1000 may comprise a duct 1002, an array of vanes 1004, an outer envelope 1006, a centerline axis 1008, a fan 1010, a bypass and core duct 1012 and 1014, respectively, and an actuation ring 1016. The core duct 1012 may provide fluid flow to a compressor, combustor and turbine. The duct 1002 directs the fluid flow in a direction along the centerline axis 1008. The array of vanes 1004 are positioned circumferentially around the centerline axis for directing and/or controlling the fluid flow within the duct 1002. Similar to the vanes described in FIG. 1, each vane of the array 1004 comprises a pair of lateral major surfaces forming a leading and trailing edge, a stem 1018 penetrating through the outer envelope 1006 of the duct 1002, and an axis of articulation 1020 spaced from the aerodynamic center of the vane. The vanes of the array 1004 may also include a second stem 1024 on its end proximal to the centerline axis 1008, thereby fixing two points around which the vane will articulate. The actuation ring 1016 functions similarly to the linkage 108 and is mounted circumferentially around the centerline axis 1008 outside of the outer envelope 1006 of duct 1002. The actuation ring 1016 is operably coupled to each of the vanes of the array 1004 to couple the articulation of each vane. The actuation ring 1016 may be operably moved with an actuator member to affect articulation of the array of vanes 1004, and may incorporate features of the embodiments of the linkage 108 described above. The array 1004 may be located on either side of the fan 1010.

Vanes of the array 1004 may engage the actuation ring 1016 on either its leading or trailing edge as described above. The articulation of the vanes of the array 1004 will lead to the generation of moments on the vanes due to system fluid flow and pressure forces, which in turn exert a resisting force on the actuation ring 1016, which is transferred to the actuator member (not shown). The force exerted on the actuation ring 1016 by one vane will be at least partially canceled by the force exerted on the actuation ring 1016 by one or more other vanes of the array 1004. In some embodiments, the force exerted on the actuation ring 1016 by each vane is substantially canceled by the forces from one or more other vanes such that the total forces on the actuation ring 1016 is minimized, if not negligible.

Figure 11:
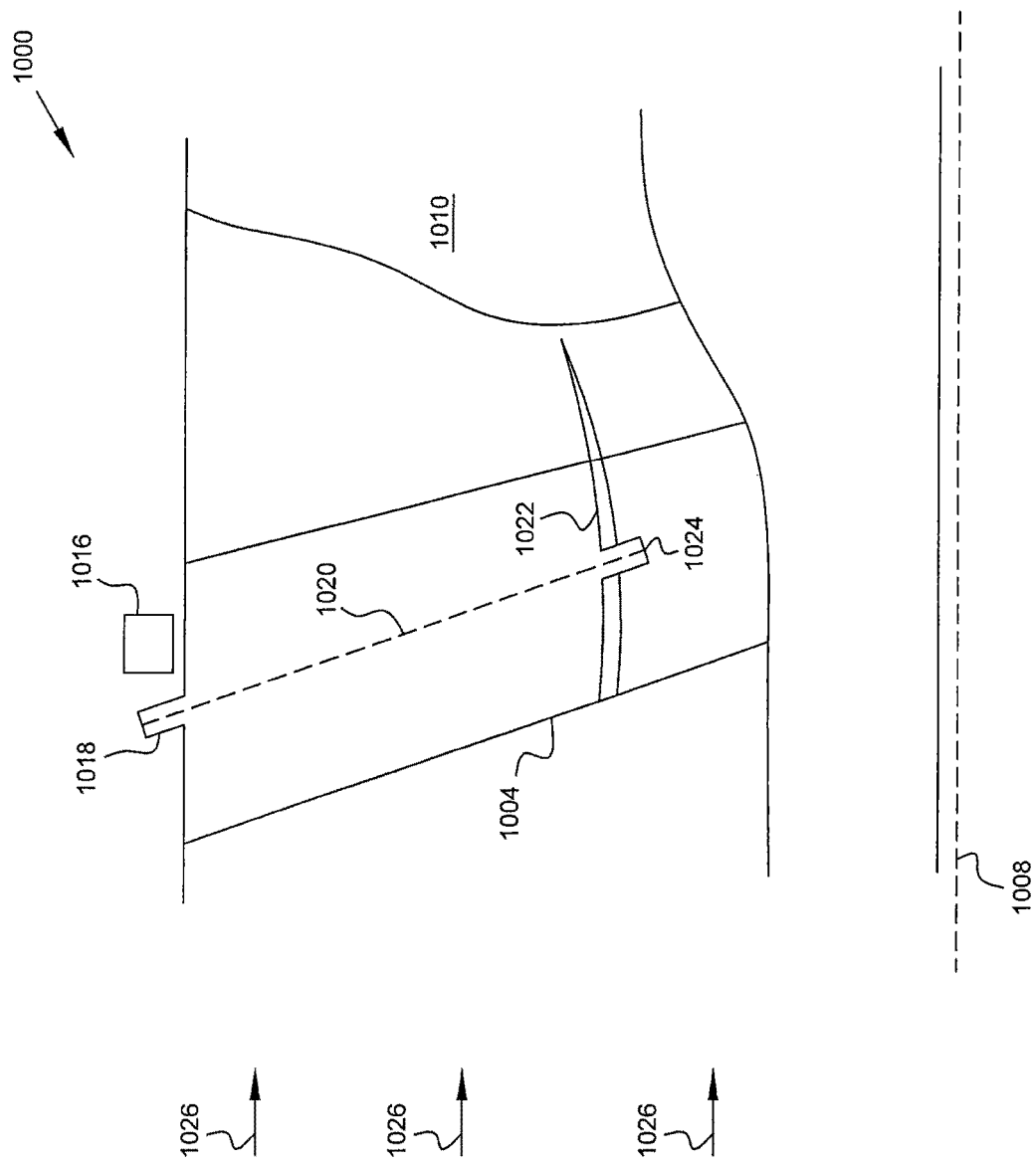
FIG. 11 is a detailed axial cross-section view of a radially split guide vane in accordance with some embodiments of the present disclosure.

The duct 1002 may be divided into a bypass duct 1012 and a core duct 1014. In some embodiments it may be desirable to throttle or block flow to only one of the bypass or core ducts 1012, 1014. As shown in FIG. 11, the array of vanes 1004 may be disposed in the radially outer portion of the engine 1000. The vanes of the array 1004 may comprise a second stem 1024 on the radially inner end of vanes which may be disposed in a radial strut 1022 or an inner fixed (or variable) vane. This provides the vanes two points of articulation in order to prevent undesirable translation of the vane. In this embodiment, the articulation of the vanes affects the fluid flow 1026 in the bypass duct 1012 with minimal changes in the flow to the core duct 1014.

Figure 12:
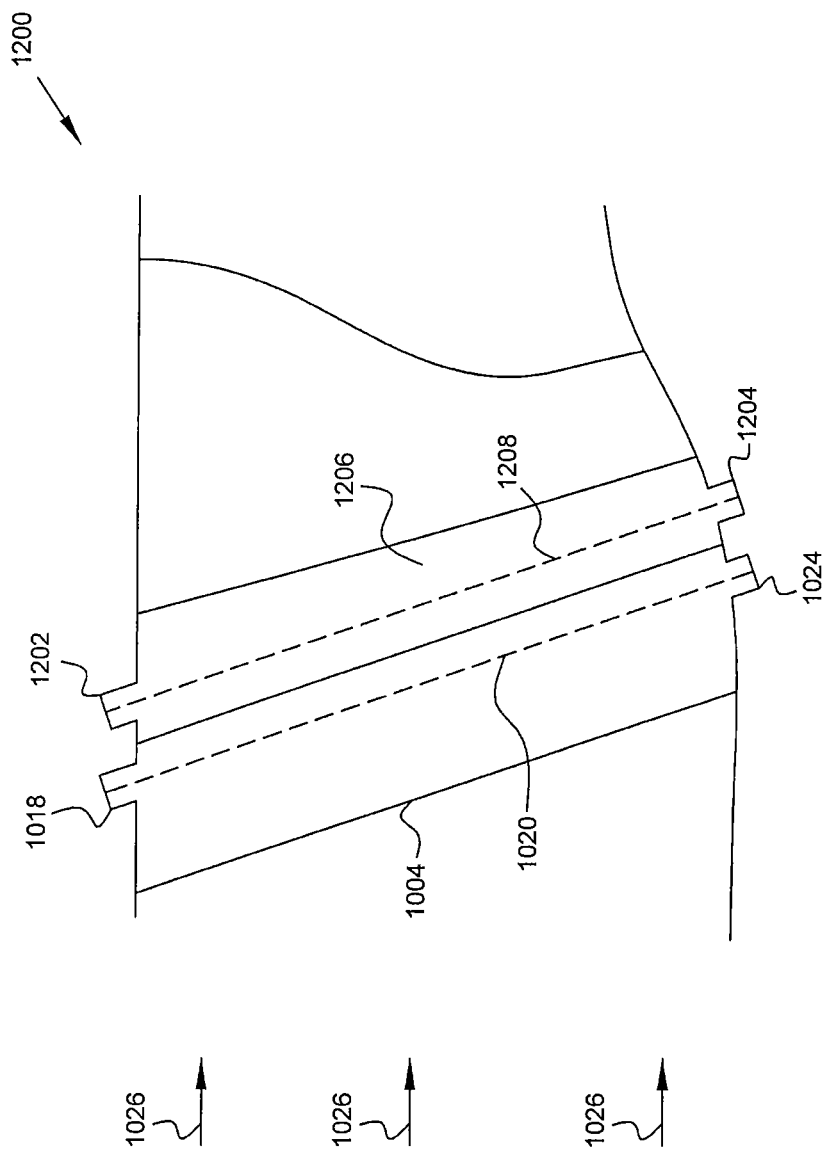
FIG. 12 is a detailed axial cross-section view of an inlet guide vane in accordance with some embodiments of the present disclosure.

In some embodiments, a vane may be further comprised of a flap operably coupled to the trailing edge of the vane which is capable of articulation independent from that of the vane. As shown in FIG. 12, a system 1200 includes a flap 1206 operably coupled at the trailing edge of a vane of array 1004. The flap 1206 comprises a pair of lateral major surfaces comprising a leading surface or edge which operably engages the trailing edge of the vane of the array 1004 (see FIG. 13), a trailing edge, stem stems 1202, 1204 about which the flap will pivot along axis 1208. Such an embodiment requires a separate linkage and/or actuator for the flap, and/or a means to connect or disconnect the operable connections between both flaps and vanes and the a linkage and/or actuator. This embodiment allows the flap to be articulated independently, such that the system can provide the same functionality as a strut-flap inlet guide vane, while providing the advantages of the present disclosure. The flap 1206 may be pinned to the vanes of array 1004 in a manner as is understood by a one of skill in the art.

Figure 13:
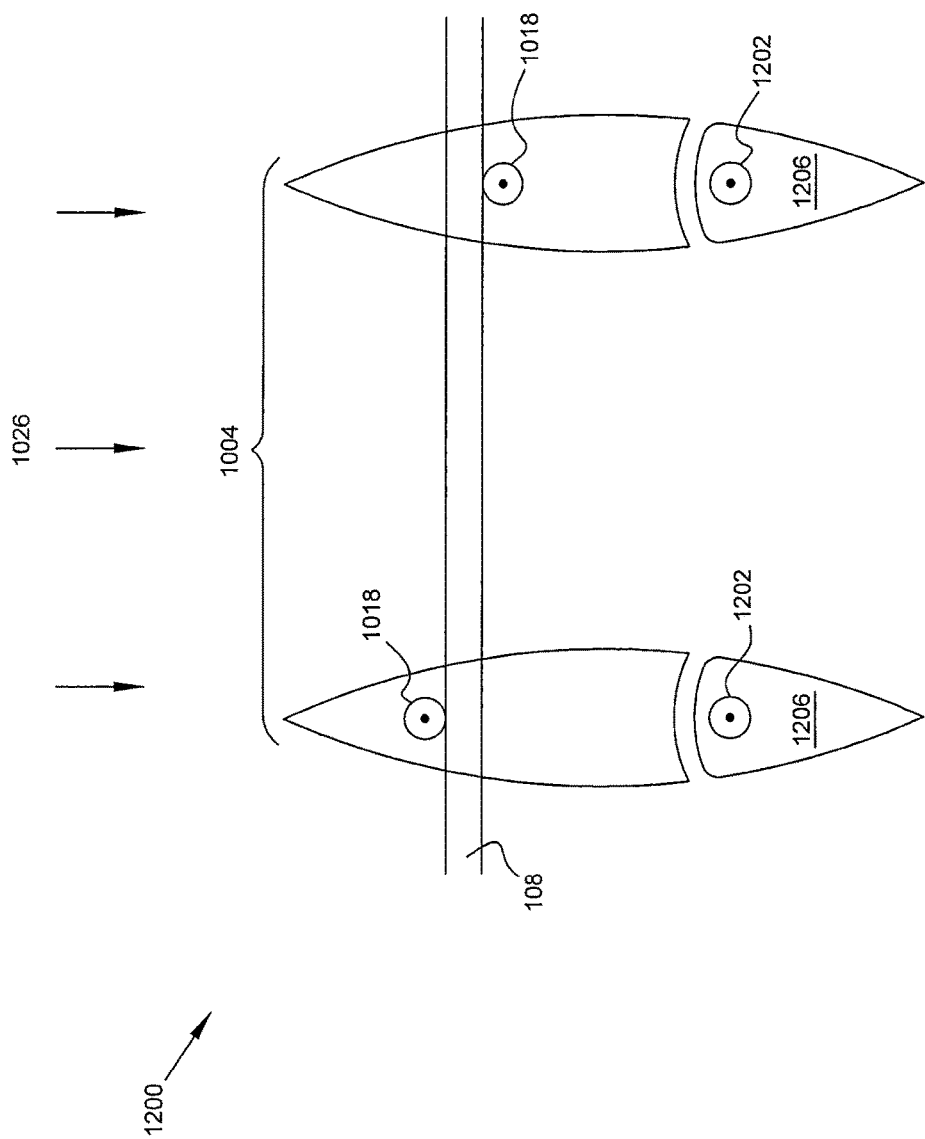
FIG. 13 is an overhead view of the inlet guide vane of FIG. 12 in accordance with some embodiments of the present disclosure.

An overhead view of the strut-flap embodiment is provided in FIG. 13, and FIG. 14. As can be seen in FIG. 14, the chord of flap 1206 is aligned parallel with the chord of the vanes of array 1004 such that both can be articulated about axis of articulation 1020 during articulation of the vanes of array 1004. In some embodiments the chord of flap 1206 may be at an angle to the chord of a vane of array 1004 to which flap 1206 is attached. To achieve this movement, a clutch or other assembly may be used to decouple the stems 1202 and/or 1204 from their pivot points and any actuation system or linkage.

Although examples are illustrated and described herein, embodiments are nevertheless not limited to the details shown, since various modifications and structural changes may be made therein by those of ordinary skill within the scope and range of equivalents of the claims.

What is claimed is:

1. A system for directing the flow of a fluid and controlling the rate of flow of the fluid, said system comprising:
    a channel for directing the flow of the fluid;
    at least a pair of articulating vanes positioned within said channel for controlling the flow rate of the fluid within said channel, each of said vanes comprising a pair of lateral major surfaces forming a leading edge and a trailing edge of said vane, and an axis of articulation intersecting said vane at a point spaced from the aerodynamic center of said vane; and
    a linkage between said vanes coupling the articulation of each of said vanes to the other of said vanes, wherein each vane imparts a force on said linkage when the relative angle of attack is greater than zero, wherein the force imparted on said linkage by one of said vanes is at least partially cancelled by the force imparted on the linkage by the other of said vanes during the articulation of said vanes, wherein the axis of articulation of one of said vanes intersects said vane between the aerodynamic center and said leading edge of said vane, and the axis of articulation of the other of said vanes intersects said other vane between the aerodynamic center and said trailing edge of said other vane.

2. The system of claim 1, further comprising:
an actuator member, wherein said actuator member articulates said linkage to articulate one of said vanes about the axis of articulation in a first direction and the other of said vanes about the axis of articulation in a second direction which is different from the first direction.

3. The system of claim 2, wherein said actuator member articulates said linkage such that said leading edge of one of said vanes operably engages said leading edge of the other of said vanes.

4. The system of claim 1, wherein each of said vanes further comprises a stem and gear set disposed on said stem and wherein said linkage comprises a rack with a plurality of gear teeth for operably engaging each gear set to couple the articulation of said vanes.

5. The system of claim 1, wherein each of said vanes further comprises a stem, and said linkage comprises a plurality of lever arms for operably engaging said stems to couple the articulation of said vanes.

6. The system of claim 1, wherein each of said vanes further comprises a cam and a restoring spring, wherein said linkage couples the articulation of each vane via said cam.

7. The system of claim 1, wherein said linkage is an elongated member positioned transverse to the direction of flow of the fluid.

8. The system of claim 7, wherein said linkage is operably coupled to each of said vanes at a leading edge of said linkage.

9. The system of claim 7, wherein said linkage is operably coupled to one of said vanes at a leading edge of said linkage and the other of said vanes at a trailing edge of said linkage.

10. The system of claim 9, wherein the axes of articulation of said vanes are laterally aligned.

11. The system of claim 1, wherein the force imparted on said linkage by one of said vanes is cancelled by the force imparted on the linkage by the other of said vanes during articulation of said vanes.

12. The system of claim 1, further comprising:
an array of articulating vanes that comprises said at least a pair of articulating vanes, said linkage coupling the articulation of each of said vanes of said array, wherein the force imparted on said linkage by each vane of said array is at least partially cancelled by the force imparted on said linkage by at least one other vane of said array during the articulation of said vanes.

13. The system of claim 12, further comprising:
an actuator member, wherein said actuator member articulates said linkage to articulate each vane of said array about the axis of articulation such that either a leading or trailing edge of each of said vanes of said array operably engages a leading or trailing edge of at least one other of said vanes of said array, and the force imparted on said linkage by each of said vanes of said array is cancelled by the force imparted on said linkage by at least one other of said vanes of said array during the articulation of said vanes.

14. The system of claim 12, wherein a lateral spacing between the axes of articulation of any pair of said vanes of said array does not equal a second lateral spacing between the axes of articulation of at least one other pair of said vanes of said array.

15. The system of claim 1, wherein each of said vanes further comprises a flap being operably coupled to said trailing edge of said vane to articulate about a flap axis parallel to said axis of articulation.

16. The system of claim 15, wherein the chord of said flap is parallel with the chord of said vane during articulation of said vanes.

17. A system for directing the flow of a fluid in a turbofan jet engine and controlling the rate of flow of the fluid, said system comprising:
a duct for directing the flow of the fluid along a centerline axis of said engine;
an array of articulating vanes positioned circumferentially around the centerline axis within said duct for directing and controlling the flow of the fluid within said duct, each of said vanes comprising a pair of lateral major surfaces forming a leading edge and trailing edge of said vane, a stem protruding through said duct, and an axis of articulation intersecting said vane at a point spaced from the aerodynamic center of said vane; and
a circumferential actuation ring positioned outside said duct, said actuation ring being operably coupled to the stem of each of said vanes to couple the articulation of each vane about its axis of articulation, wherein each vane imparts a force on said actuation ring when the relative angle of attack is greater than zero,
wherein the force imparted on said actuation ring by one of said vanes is at least partially cancelled by the force imparted on the actuation ring by at least one other of said vanes during articulation of said vanes, wherein the axis of articulation of one of said vanes intersects said vane between the aerodynamic center and said leading edge of said vane, and the axis of articulation of another of said vanes intersects said another vane between the aerodynamic center and said trailing edge of said another vane.

18. The system of claim 17, wherein said duct comprises an inlet duct and said vanes are positioned in a radially outer portion of said inlet duct.

19. The system of claim 17, further comprising:
an actuator member, wherein said actuator member articulates said actuation ring to articulate said array of vanes such that either a leading or trailing edge of one of said vanes operably engages a leading or trailing edge of at least one other of said vanes, and the force imparted on said actuation ring by each of said vanes is cancelled by the force imparted on said actuation ring by at least one other of said vanes during the articulation of said vanes.

\* \* \* \* \*